G. V. CURTIS.
UNIVERSAL JOINT.
APPLICATION FILED DEC. 17, 1920.

1,389,422. Patented Aug. 30, 1921.

WITNESS:
A. C. Fairbanks

INVENTOR.
George V. Curtis,
BY
Frank A. Cutter.
ATTORNEY.

UNITED STATES PATENT OFFICE.

GEORGE V. CURTIS, OF WEST SPRINGFIELD, MASSACHUSETTS.

UNIVERSAL JOINT.

1,389,422.

Specification of Letters Patent.   Patented Aug. 30, 1921.

Application filed December 17, 1920.  Serial No. 431,319.

*To all whom it may concern:*

Be it known that I, GEORGE V. CURTIS, a citizen of the United States of America, and a resident of West Springfield, in the county of Hampden and State of Massachusetts, have invented a new and useful Universal Joint, of which the following is a specification.

My invention relates to improvements in that class of devices commonly known as "universal joints" used to connect rotatively two shafts which are in angular relationship, and resides broadly and generally in a pair of shaft couplers bifurcated at adjacent terminals as usual, but having the arms of each coupler connected at their outer ends, together with an intermediate connecting member, all as hereinafter set forth.

The primary object of my invention is to produce a universal joint which consists in whole or in part of sheet-metal, so that the same is from the very nature of its construction exceedingly inexpensive. By using sheet-metal in the construction of the shaft couplers, and of the intermediate member as well, if desired, it is possible to produce a universal joint at a greatly reduced cost as compared with even the least expensive universal joints constructed in the old way, as will readily be understood, and one which is as adaptable and useful in a great many cases as is a universal joint of the old type.

A further object is to provide a universal joint of this character which consists of few parts, and is compact and strong.

Other objects and advantages will appear in the course of the following description.

I attain the objects and secure the advantages of my invention by the means illustrated in the accompanying drawings, in which—

Figure 1:
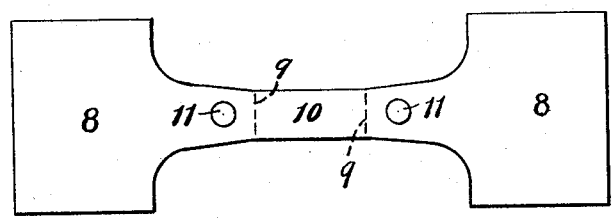
Figure 2:
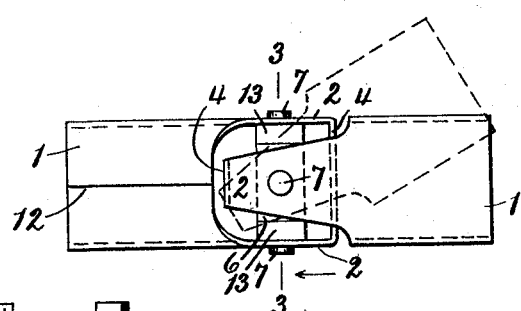
Figure 3:
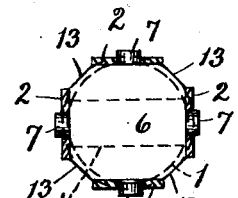
Figure 4:
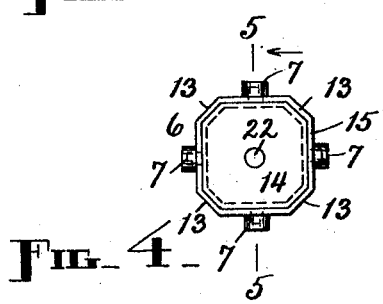
Figure 5:
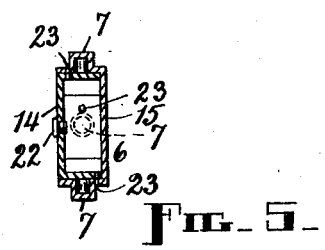
Figure 6:
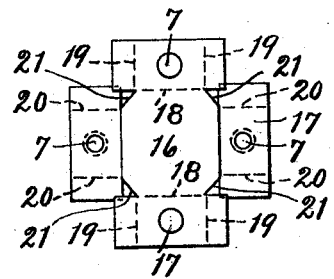
Figure 7:
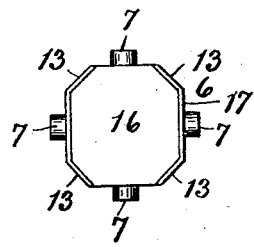

Figure 1 is a side elevation of a sheet-metal blank from which may be formed one of the shaft couplers of a universal joint that embodies a practical form of my invention; Fig. 2, a side elevation of such joint complete, the two couplers being shown in alinement in full lines, and one of said couplers being shown out of alinement with the other coupler by broken lines; Fig. 3, a cross section through said joint, taken on lines 3—3, looking in the direction of the associated arrow, in Fig. 2; Fig. 4, a broadside elevation of a sheet-metal block that may be substituted for the solid block appearing in the two preceding views; Fig. 5, a central, vertical section through said sheet-metal block, on lines 5—5, looking in the direction of the associated arrow, Fig. 4; Fig. 6, a side elevation of two sheet-metal blanks relatively placed for the formation of a modification of the sheet-metal block illustrated in Figs. 4 and 5, and, Fig. 7, a broadside elevation of the modified sheet-metal block.

Similar reference characters designate similar parts throughout the several views.

Referring to the drawings it will be seen that my universal joint consists of a pair of couplers 1 having two pair of arms 2 which are connected by two cross-pieces 4, and an intermediate connecting block 6 having four trunnions 7.

Each coupler 1 may be formed out of a sheet-metal blank, such as that illustrated in Fig. 1, which blank is bent and rolled to produce the coupler. The wide end portions 8, of the aforesaid blank, when rolled and joined at their side or juxtaposed edges form the cylindrical part of the coupler, which is the part that is attached to one of the two shafts (not shown) that the complete joint was designed to couple together. Before the semi-cylindrical rolls formed from the parts 8 can be brought into juxtaposition, the blank is bent in the same direction on the dotted lines 9—9, which extend transversely across the narrow strip 10 which connects said parts 8, until the end portions of said strip with the attached parts 8 are parallel with each other and at right-angles to the central portion of said strip that is between said lines. This central portion of the strip 10 forms the cross-piece 4 and the remaining portions of said strip form the arms 2 of the coupler. Holes 11—11 are punched in the strip 10, outside of the lines 9, for two of the block trunnions 7 when the blank is converted into the coupler. The contiguous or juxtaposed edges of the parts 8, when the latter are rolled and brought together, are secured by crimping, soldering, brazing, welding, or other suitable means. One of the joints thus formed in one of the couplers 1 appears at 12 in Fig. 2. Both couplers 1 are alike; and they must be connected with each other during the formative process or before they are completed, due to the presence of the two integral cross-pieces 4.

The block 6, whether solid or hollow, fits between the two pairs of arms 2, with the trunnions 7 journaled in said arms, and such block with its trunnions must also be placed in position at the time the two couplers 1 are connected the one with the other. As a matter of fact, the parts of this universal joint are formed and assembled at practically the same time, if the block 6 be considered as a constituent part like each of the two coupler blanks.

The trunnions 7 project from the block 6 at the ends of the diameters of said block, and two oppositely-disposed trunnions are journaled in the arms 2 of one of the couplers 1, and the other two are journaled in the arms of the other coupler. Preferably the superficial area of the block 6 is reduced by cutting off the corners, as represented at 13, so as to permit a wider range of relative movement to the couplers 1 than would otherwise be possible. The edges of the block 6 from which the trunnions 7 project extend at right angles to the axes of said trunnions, on both sides thereof in each case, and thus ample support is afforded for the arms 2, and the strength, stability, and rigidity of the structure are thereby enhanced, although these factors would not be present in a sufficient degree were it not for the cross-pieces 4 to connect and stay said arms. The solid block might, of course, be cylindrical, but in that event it would not afford the amount of support needed in many if not most cases for the arms 2, as will be readily seen.

Each cross-piece 4 prevents the arms 2 connected thereby from opening or spreading at their outer or what otherwise would be their free ends, and it also strengthens and stiffens the device in other respects. Without the cross-pieces 4 it would not be practicable to make a universal joint of so comparatively light material as sheet-metal.

In Figs. 4 and 5 a block 6 of sheet-metal is illustrated, the same consisting of two cups 14 and 15 formed into shape and fitting the former in the latter. The cups 14 and 15 are telescoped with their broad sides outermost, and secured together by brazing, soldering, or other suitable means. Exteriorly this hollow block is similar to the solid block, and it serves the same purpose. The trunnions 7 in this case are "drawn" out of the edges or edge portions of the cup 15.

The block 6 illustrated in the last two views is also a sheet-metal block, but here there are two sheet-metal blanks 16 and 17 which are bent into interengaging relationship and block formation, and secured together as in the case of the other sheet-metal block. This hollow block is also similar to the solid block, and serves the same purpose. Each of the blanks 16 and 17 is cut to form, when bent into shape, one side, two parallel edges, and four oblique edges of the block, and two of the trunnions 7 are "drawn" out of said parallel edges. With the two blanks arranged as represented in Fig. 6, opposite portions of the blank 16 are bent downwardly, on the dotted lines 18—18, to form two parallel edges of the block, and the end portions of said first-named portions are bent inwardly, on the dotted lines 19, to form in part 4 of the oblique edges 13 of said block; and opposite portions of the blank 17 are bent upwardly, on the full lines bounding the intermediate or central part of the blank 16, at the right and left hand edges of such part, to form the other two parallel edges of the block, and the end portions of said first-named portions of said blank 17 are bent inwardly, on the dotted lines 20, to overlap those portions of the blank 16 that already have been bent to form in part said oblique edges of the block, wherefore such edges are of double thickness. In order to render possible the formation of the oblique edges 13, it is necessary to notch each of the blanks, as represented at 21 in Fig. 6.

The hollow block affords convenient means for lubricating the universal joint, since such block is adapted to contain oil, and can readily be perforated to permit the oil to be distributed to the points where lubrication is needed. In the block illustrated in Figs. 4 and 5, a filling opening for oil is shown in one side of said block, such opening being closed by a plug 22, and openings for the distribution of the oil to points adjacent to the trunnions 7, where lubrication is required, are represented at 23.

My universal joint operates in practically the same manner as do other devices of a similar nature and for a similar purpose.

I am aware that the bifurcated terminals of universal-joint couplers have been closed by members which form bearings or parts of bearings for spherical intermediate elements, but the latter are not the equivalents of blocks such as I employ, and my cross-pieces are in no sense bearings for intermediate elements, but solely tie pieces or stays for the arms of the couplers, remote from and clear of the blocks.

More or less change in the shape, size, construction, and arrangement of some or all of the parts of my universal joint, in addition to the modifications illustrated and described in detail herewith, may be made without departing from the spirit of my invention or exceeding the scope of what is claimed.

What I claim as my invention, and desire to secure by Letters Patent, is—

1. As an improved article of manufacture, a universal joint comprising sheet-metal shaft couplers, each having arms connected by cross-pieces, jointed only in the body portion of the coupler, and an intermediate member articulated to all of said arms.

2. As an improved article of manufacture, a universal joint comprising shaft couplers, each having arms connected by cross-pieces, jointed only in the body portion of the coupler, and an intermediate sheet-metal member articulated to all of said arms.

3. As an improved article of manufacture, a universal joint comprising shaft couplers, each having arms connected by cross-pieces, jointed only in the body portion of the coupler, and an intermediate hollow member articulated to all of said arms.

4. As an improved article of manufacture, a universal joint comprising sheet-metal shaft couplers, each having arms connected by cross-pieces, jointed only in the body portion of the coupler, and an intermediate sheet-metal member articulated to all of said arms.

5. As an improved article of manufacture, a universal joint comprising sheet-metal shaft couplers, each having arms connected by cross-pieces, jointed only in the body portion of the coupler, and an intermediate hollow member articulated to all of said arms.

6. In a universal joint, a piece of sheet-metal cut to form sections of a shaft coupler, arms, and a cross-piece connecting said arms, said sheet-metal piece being bent approximately at right-angles at the junctions of said arms with said cross-piece, and said sections having straight edges at their outer ends, and straight side edges, and being secured together at said last-named edges.

7. As an improved article of manufacture, a universal joint comprising shaft couplers, each having perforated arms connected at their outer ends by cross-pieces, and jointed in the body portion of the coupler, and a hollow block between said arms and provided with trunnions to enter and operate in the perforations therein.

8. As an improved article of manufacture, a universal joint comprising shaft couplers, each having perforated arms connected at their outer ends by cross-pieces, and jointed in the body portion of the coupler, and a hollow block between said arms and provided with trunnions to enter and operate in the perforations in said arms, said block having oil holes therein.

9. As an improved article of manufacture, a universal joint comprising shaft couplers having perforated arms connected by cross-pieces, and a two-part intermediate member between said arms and provided with trunnions to enter and operate in the perforations therein.

10. As an improved article of manufacture, a universal joint comprising shaft couplers having perforated arms connected by cross-pieces, and a sheet-metal block between said arms and provided with drawn trunnions to enter and operate in the perforations therein.

11. As an improved article of manufacture, a universal joint comprising shaft couplers having perforated arms connected by cross-pieces, and a two-part sheet-metal block between said arms and provided with drawn trunnions to enter and operate in the perforations therein.

12. As an improved article of manufacture, a universal joint comprising shaft couplers, each having arms connected by cross-pieces, which arms extend inwardly beyond the plane of the outer ends of the arms on the other coupler, and an intermediate member articulated to all of said arms, said couplers being constructed to enable the arm- and cross-piece-forming parts of one to be interengaged with the corresponding parts of the other, before being bent to form.

GEO. V. CURTIS.

Witnesses:
F. A. CUTTER,
A. C. FAIRBANKS.